Aug 5, 1941.  E. A. SPANGLER  2,251,299
PORTABLE HAMMOCK ASSEMBLY
Filed Jan. 16, 1939
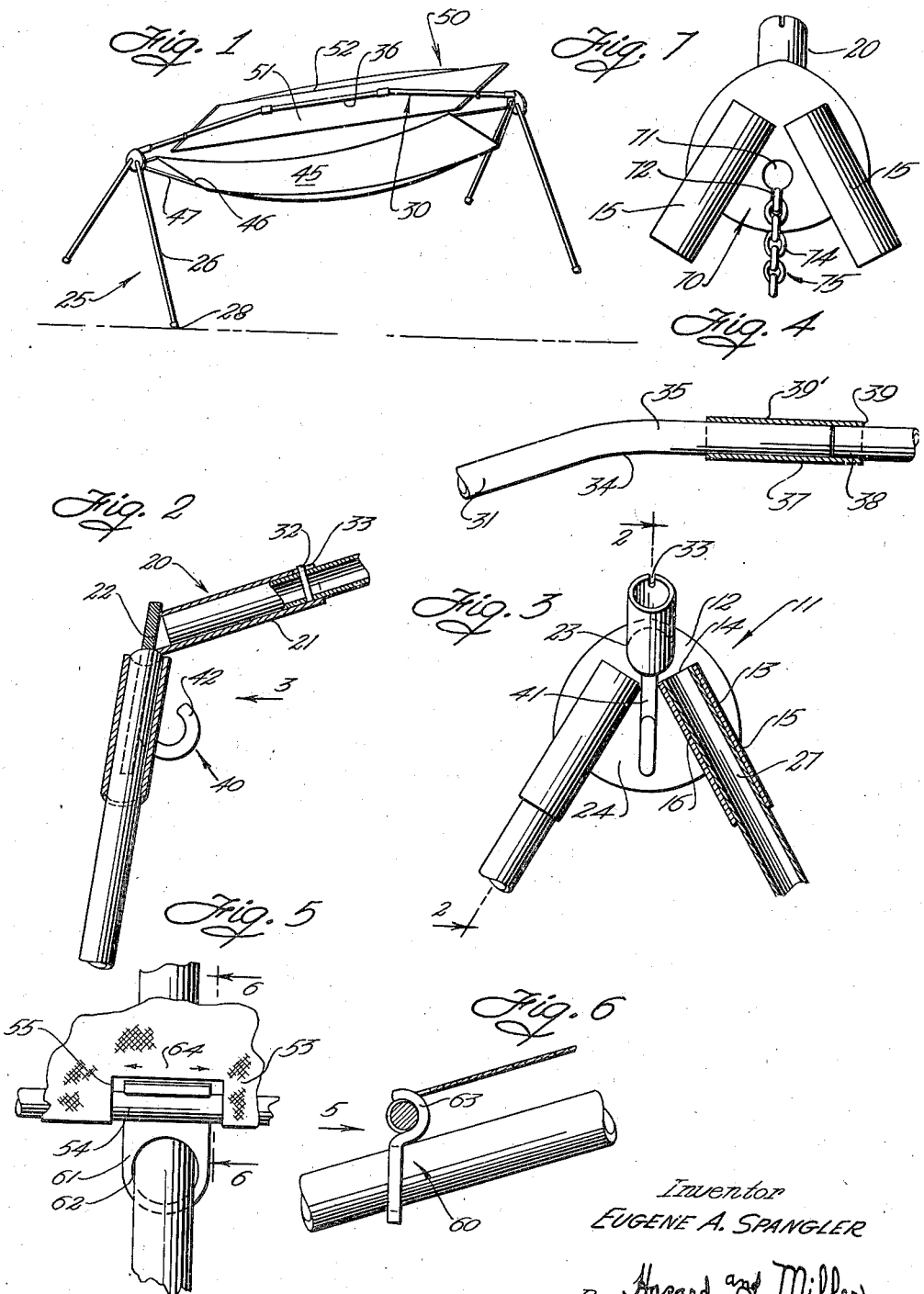
Inventor
EUGENE A. SPANGLER
By Hazard and Miller
Attorneys Patented Aug. 5, 1941

2,251,299

UNITED STATES PATENT OFFICE 2,251,299

PORTABLE HAMMOCK ASSEMBLY

Eugene A. Spangler, Los Angeles, Calif.

Application January 16, 1939, Serial No. 251,091

5 Claims. (Cl. 5—130)

My invention relates to a portable frame on which a hammock may be swung, this frame being disconnected by suitable joints at the legs and in my invention I also have a canopy to be secured over the hammock.

One of the objects and features of my invention is the employment of a thrust bar which connects the apices or meeting angle of two legs at each end of the hammock frame. The legs and the thrust bar may be connected by means of a disconnectible angle socket plate, the hammock being then swung between hooks attached to the socket plate and therefore the tension caused by the weight of a person in the hammock is resisted by the thrust bar and this prevents the upper ends of the legs being pulled together. A further feature of my invention relates to the details of the socket plates, these consisting of two plates, one for each end of the frame and having tubular sockets connected thereto and pointing downwardly at an angle to each other so that the axis of each socket forms with a vertical plane equal angles. Therefore the legs, there being two at each end in the form of light tubes, may be inserted in the sockets and thus the socket plate forms a sufficiently rigid attachment for the upper ends of the two legs at each end of the assembly. A further characteristic is forming the plate with two diverging slots and inserting short lengths of tube or pipe therein, these being welded to the plate at the slots and thereby forming the sockets intersected by the plane of the plate. The upper end of each of the slots forms a thrust abutment for the upper ends of the rods or tubes forming the legs. A further characteristic is attaching a third socket tube to the inside face of the plate at a slight angle, this projecting upwardly while the plate is at an angle to a transverse vertical plane so that the legs tilt outwardly at the bottom and it is into this third socket on the inside face of the plate that the end of the thrust bar is inserted. To prevent rotation of the thrust bar I have a pin and notch connection into this third or inner face socket.

Another characteristic of my invention is forming the thrust bar with the portions adjacent each end extending upwardly at an angle in reference to a horizontal plane and then being connected by a center piece which is horizontal. This connection is made by having two sockets of which they may be made on the inclined portions of the thrust plate or on the center portion and in effect form a telescopic fit, however without any adjustment. This construction therefore causes the thrust bar to extend upwardly a considerable distance above a horizontal line joining the hooks to which the hammock is attached and at the center gives a sufficient clearance for the head of the person using the hammock.

A further feature of my invention relates to a location and mounting of the canopy. This canopy. This canopy consists of a strip of canvas having parallel sides and ends at right angles thereto, such being made of canvas. A substantial rod is inserted through a hem at each end of the canopy. Then I employ a pair of hooks with an eye, such eye encircling the inclined part of the thrust bar. The hem is provided with a cut-out section so that the hooks may engage the cross bar at the ends of the canopy. Thus by pulling the hooks with the eyes apart, the strip forming the canopy may be stretched and the pull on the canvas gives a tilt to the eyes causing these to bite and engage on the sloping portion of the thrust bar.

In view of the fact that the two ends of the canopy are on the inclined portion of the thrust bar it causes the upper portion of these inclined ends and the horizontal center section to press into the canopy and form in effect a ridge when the canopy is positioned symmetrical as to the frame. However when the canopy is tilted the upwardly extending center section and the inclined portions of the thrust bar engage the canopy at one side of the center line holding this in place against winds and to form a shade from slanting sunlight.

A further object and feature of my invention is to make hammock assembly with the supporting structure for swinging the hammock and the cover hood of such a nature that the assembly may be readily disconnected and made into a convenient roll or package for transportation from one place to another. The whole equipment when packed may fit in a dunnage bag and thus be used conveniently for picnics, camping or the like.

My invention is illustrated in connection with the accompanying drawing, in which:

Fig. 1 is a perspective view of my invention including the frame, the hammock and the canopy mounting.

Fig. 2 is a vertical section on the irregular line 2—2 of Fig. 3 in the direction of the arrows illustrating particularly the socket plate for the assembly of the legs and the inclined sections of the thrust bar.

Fig. 3 is an inside view taken in the direction of the arrow 3 of Fig. 2 illustrating mainly the thrust plates and the sockets attached thereto.

Fig. 4 is a side elevation partly broken away showing the jointed connection of the thrust bar between the inclined end portions and the center section.

Fig. 5 is an elevation taken in the direction of the arrow 5 of Fig. 6 illustrating the hook on the sloping thrust bar end portions and the attachment of the canopy.

Fig. 6 is a section taken on the line 6—6 of Fig. 5 in the direction of the arrows.

Fig. 7 is an outside elevation showing one of the thrust plates with a socket attached thereto illustrating the connection for a chain to support the hammock.

Referring first to the frame construction, this uses as a main element the socket plates 11, each of which consists of a flat plate 12 with a pair of diverging slots 13 therein, the slots terminating at the abutment end 14. These slots diverge symmetrically relative to a vertical line through the plate. Fitted in each slot there is a socket tube 15, this having a close fit and being secured by welding 16 at the periphery of the pipe and the edge 13 of the slots. The plane of the plate preferably intersects the socket pipes in a diametrical plane. By this construction the socket tubes and the plate are rigidly secured together. A third socket 20 also consists of a socket tube 21 having its end cut on a bevel, as indicated at 22 and welded at the contact face 23 where it engages the inside face 24 of the socket plate. This third socket is located above the abutment ends 14 of the slots 13 and hence above the socket tubes 15. It is intended that when the hammock is used the socket plate occupies a sloping plane such as shown at Fig. 2 in reference to a vertical plane and the third socket 21 is inclined upwardly at a considerable angle above the horizontal.

The leg assemblies 25 consist of two similar legs 26 at each end. These are preferably formed of light tubing, the upper end portion 27 fitting in the socket pipes 25 and engaging the thrust end 14 of the slots 13. The lower ends preferably have rubber caps 28 contacting the ground. The leg assemblies are therefore quite rigid with the socket plate which socket plate can be made of any desired shape on the peripheral contour. In the illustration of Fig. 3 the edges are curved.

The connecting thrust bar assembly 30 includes two inclined end pieces 31 each of which has a stud or pin 32 fitting in a longitudinal notch 33 in the third socket 21. This prevents rotation of the thrust bar. Each thrust bar end preferably has a bend 34 and a horizontal end section 35. The center section 36 of the thrust bar has a socket pipe 37 attached thereto at each end, there being an overlap as indicated at 38 and the socket pipe being welded as indicated at 39. This leaves a relatively long socket 39' in which the horizontal end 35 of the inclined end pieces 31 may be fitted. Therefore this thrust bar forms a rigid connection between the end leg assemblies and the socket plate assemblies. The pin and notch connection prevents twisting or turning of this angularly offset thrust bar.

The thrust plate is provided with hammock hooks designated 40. Each hook has an attachment end 41 which is fitted against the inside face 24 of the socket plate between the socket tubes 15 and has the hook end 42 facing inwardly. The portion 41 is attached to the socket plate by welding or the like. These hooks therefore occupy substantially a vertical longitudinal plane equidistant between the angles formed by the two legs 26 at each end. The hammock 45 is preferably formed of canvas in the usual manner having stiff end bars 46 of wood slats or light tubing from which a series of cords 47 extend to the usual eye on the end of the cords and such eye is fitted over the hook 40 thus swinging the hammock between the two leg assemblies and as above mentioned, the thrust bar resists the tension tending to pull the upper ends of the leg assembly inwardly. In many cases the persons prefer to use the hammock as above described without the canopy.

The canopy assembly 50 includes a strip of canvas 51 preferably having parallel side edges 52 and having a hem 53 at the ends with a substantial bar 54 such as a light tube extending therethrough. The hem has a cut-away section 45 at the center. The grip hooks 60 each include a plate 61 having a circular eye 62. This eye is slightly larger in diameter than the inclined section 31 of the thrust bar. The plate has a bent hook end 63 offset from the plane of the plate and being sufficiently wide in the measurement 64 to engage as long a portion as convenient of the rod 54 and to fit in the cut-out section 55 of the hem of the canvas.

In adjusting the canopy, the hook adjacent one end may be placed on the inclined section of the thrust bar where the person using the hammock prefers, the canvas strip of the canopy is then stretched so that the bar 54 at the other end is fitted in the hook 63 of the other clamping plate. The tension on the canvas causes these plates to tilt so that the eye 62 obtains a friction bight on the inclined section 31 of the thrust bar. When the canopy is fitted symmetrically as to the thrust bar, that is, the bar contacting the canopy on a longitudinal center line, the center portion of the canopy is stretched upwardly forming a ridge and the side edges 52 drape downwardly forming in effect a ridged roof covering. If it is desired to tilt the canopy to form a shade from the slanting sun or to protect the hammock from wind, it is tilted as shown in Fig. 1 in which case the thrust bar extending upwardly above a straight line joining the hook plates 60 retains the canopy at the desired inclination, the stretch of the canvas of the canopy as above mentioned, causing a locking of the hook assemblies with the hook 63 so that the canopy does not tilt or flap with the wind except of course as to the edges. It will therefore be seen that a person using the hammock can have adequate protection from the sun by locating the canopy as desired and may also by tilting the canopy to a considerable extent, secure adequate protection from side winds. It is obvious that the canopy if desired may be made considerably wider than the hammock. In the illustration they are both approximately the same width.

Fig. 7 illustrates one of the socket plates similar to that given in detail in Figs. 2 and 3 except that instead of the hook 40, the plate has a chain attaching perforation 70. This has an upper circular eye 71 and a lower narrow slit or notch 72. One end of the hammock has a chain 75 connected thereto, this chain having individual links 74 of such size that they may readily pass through the circular opening 71 but catch in the slot or notch 72. Therefore one end of the hammock may be secured to the hook 42, the chain at the other end may be pulled or loosened to swing the hammock as desired, the chain then being caught and thus holding the hammock in the desired position.

Various changes may be made in the details of the construction without departing from the spirit or scope of the invention as defined by the appended claims.

I claim:

1. A hammock assembly including a pair of flat socket plates each having downwardly and outwardly diverging slots, a socket tube fitted in each slot and welded to the plate, a third socket tube having a beveled end and welded to the inner face of each of the plates thereby adapted to extend at an upward inclination as to the horizontal, a pair of legs for each socket plate and fitted in the first pair of socket tubes, a thrust bar assembly including two inclined end pieces, each fitted in the third socket tube, a center or horizontal section having a removable connection with the inclined end sections and means to suspend a hammock between the socket plates, the thrust bar assembly being adapted to resist the tension pull of the hammock and the weight of a person on the hammock.

2. A hammock assembly as claimed in claim 1, the means to suspend the hammock including a hook secured to one socket plate, the other socket plate having an eye with a notch adapted to receive a suspension chain.

3. A hammock assembly including a pair of socket plates each occupying a single plane, each plate having a pair of downwardly diverging slots, a pair of leg socket tubes fitted in each slot, each socket tube intersecting the plane of the plate and being welded thereto, the end of each slot forming an abutment end for the socket tube, a leg fitted in each leg socket tube and engaging the abutment of the plate, a third socket tube connected to the inside face of each plate, such socket tube having a beveled end and being welded to the plate above the abutment ends of said slots, the third socket tubes having an inclination upwardly from the socket plates, the legs being adapted to occupy an upwardly and inwardly inclined position relative to a vertical plane, a thrust bar assembly having inclined end pieces fitted in the third socket tubes adapted to resist the tension of a hammock suspended between the socket plates.

4. A hammock assembly as claimed in claim 3, each of the third socket tubes having a longitudinal notch and each of the end pieces of the thrust bar assembly having a stud to fit therein and thereby prevent rotation of the thrust bar assembly, the thrust bar assembly having a horizontal center section with a socket connection at the inclined end pieces.

5. In a portable hammock assembly, a plane end thrust plate having a pair of downwardly diverging slots having an abutment end at the upper end of each slot, a cylindrical tube fitted in each slot and intersecting the plane of the plate on a diameter of the tube, such tube being welded to the plate and each of the tubes forming a leg receiving socket, a third socket tube having a beveled inner end welded to the inside face of the thrust plate above the end abutments, such third socket tube being inclined upwardly when the thrust plate occupies its normal position in the hammock assembly.

EUGENE A. SPANGLER.